United States Patent
Jackson

(10) Patent No.: US 6,176,145 B1
(45) Date of Patent: Jan. 23, 2001

(54) ACTUATING MECHANISM

(75) Inventor: Jay E. Jackson, Cleveland, TN (US)

(73) Assignee: Columbus McKinnon Corporation, Amherst, NY (US)

(*) Notice: Under 35 U.S.C. 154(b), the term of this patent shall be extended for 0 days.

(21) Appl. No.: 09/346,363

(22) Filed: Jul. 1, 1999

(51) Int. Cl.$^7$ .................................................. F16H 29/02

(52) U.S. Cl. ............................ 74/89.15; 254/231; 254/232

(58) Field of Search .................... 74/89.15; 254/231, 254/232, 233, 234

(56) References Cited

U.S. PATENT DOCUMENTS

| | | | |
|---|---|---|---|
| 4,790,201 | 12/1988 | Gheddo | 74/89.15 |
| 5,544,801 | 8/1996 | Schick | 74/89.15 |

*Primary Examiner*—Leonard A. Footland
(74) *Attorney, Agent, or Firm*—Phillips, Lytle, Hitchcock, Blaine & Huber LLP

(57) ABSTRACT

The invention is directed to an improved actuating mechanism. In the preferred embodiment, the actuating mechanism (15) is comprised of a split housing (16), a gear transfer system (18) enclosed in the housing, a threaded barrel (19) extending from the housing, a screw rod (20) threaded for movement through the barrel, an end plate (21) mounted to the housing opposite the barrel, the transfer system communicating with a driver input (22) and the barrel, whereby rotation of the transfer system will cause rotation of the barrel and axial movement of the screw rod through the barrel. The transfer system comprises beveled ring (23) and pinion (24) gears. The driver input comprises a square recess set in the pinion gear. The driver input may be adapted for operation with either a pneumatic driver or a manual driver. The housing is filled with grease and the barrel and housing are adapted to be greased by means of a conventional grease gun. The end plate and screw rod include clevis end connections (28, 32). The present invention also discloses an actuating mechanism in which the barrel and housing are adapted to allow removal of the end plate and the insertion of a second screw rod (31) threaded for movement through the barrel opposite the first screw rod, whereby rotation of the transfer system will cause axial movement of both screw rods through the barrel.

14 Claims, 3 Drawing Sheets

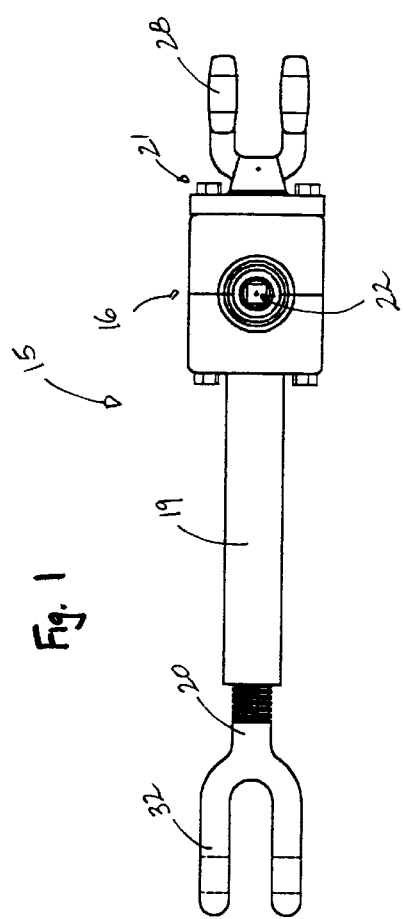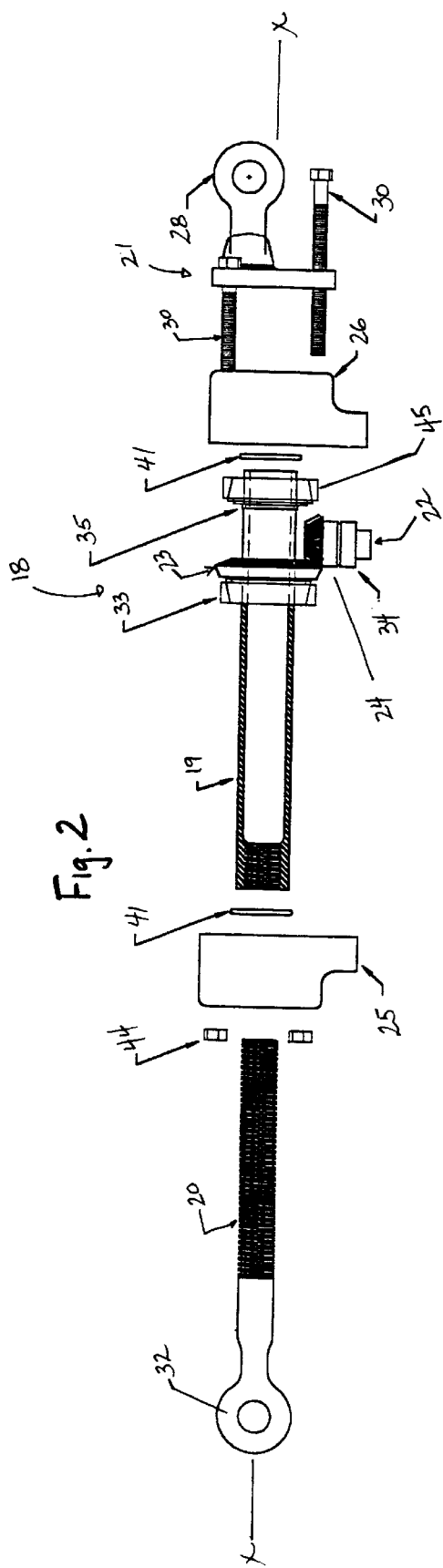

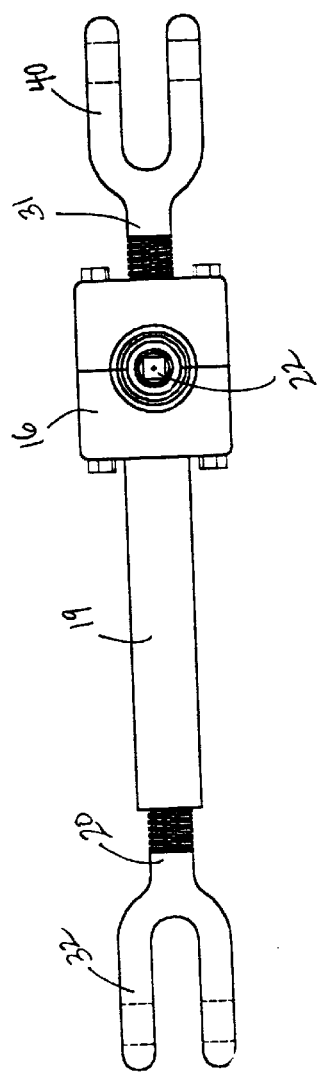
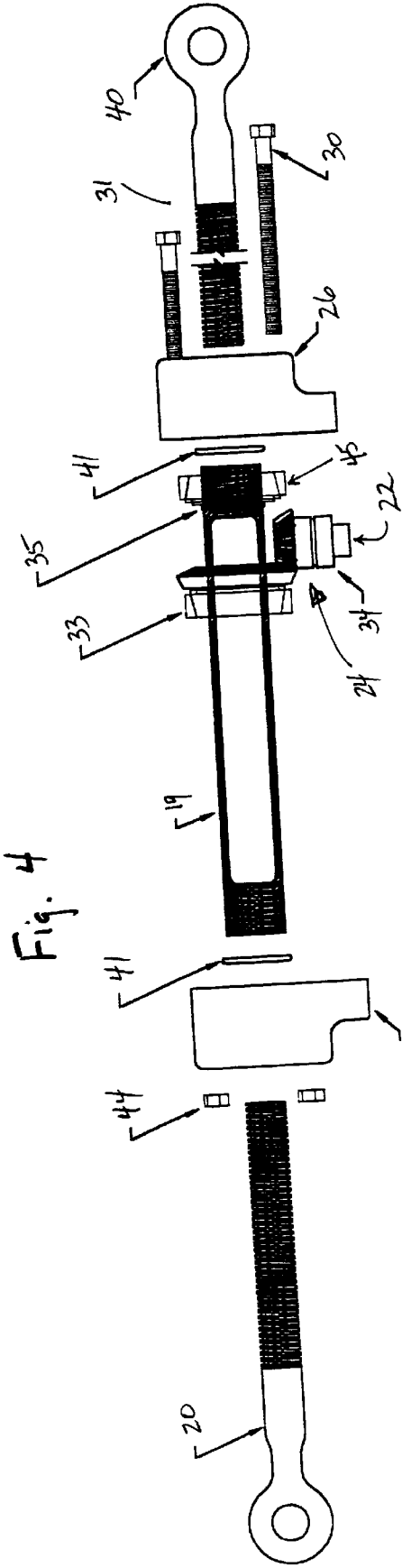

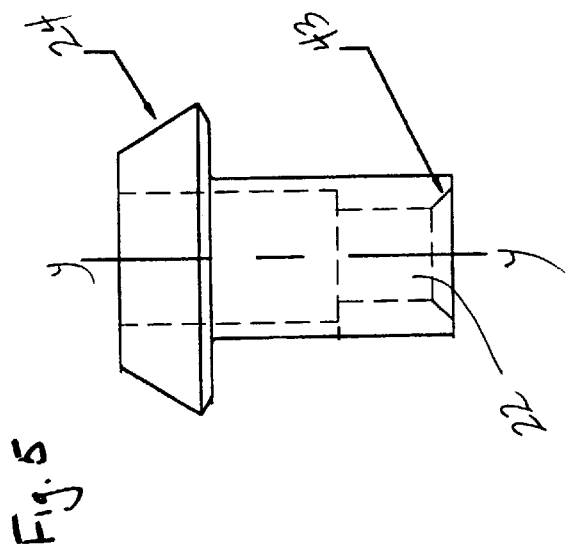
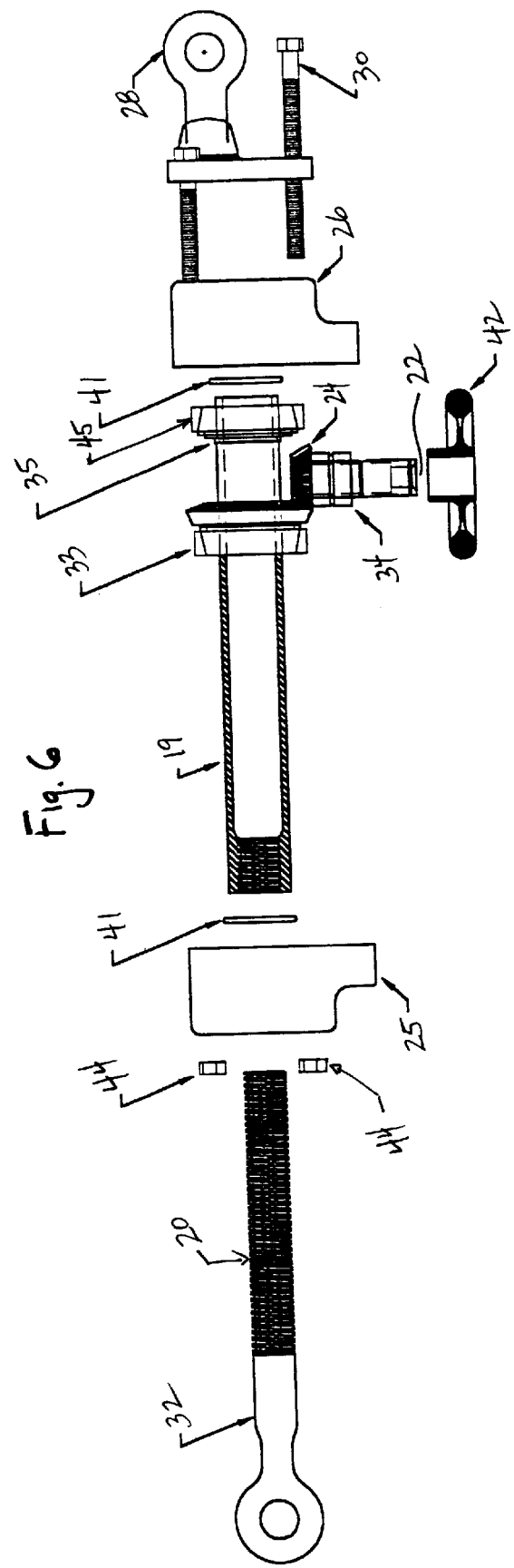

ACTUATING MECHANISM

FIELD OF THE INVENTION

The present invention relates generally to the field of actuators and, more particularly, to an improved actuating mechanism for providing compression and tensioning forces.

Background Art

A variety of chain or rope tighteners are known for providing tightening forces. Similarly, a variety of hoists or jacks are known for providing compression forces. Examples of such mechanisms are disclosed in U.S. Pat. Nos. 217,091, 1,157,110, 1,686,501, 1,378,702, 2,426,717, 3,980,275 and 4,130,269.

Although these tensioning and compressing devices are useful, they are not versatile or durable and are cumbersome to use. Hence, it would be useful to provide an improved power driven actuating mechanism which may be adapted to operate as a tensioning turnbuckle or a fixed-end linear actuator, which may be driven by a wide variety of power drivers or a manual driver, and which has features which provide for a more durable and smoother operating mechanism.

DISCLOSURE OF THE INVENTION

With parenthetical reference to the corresponding parts, portions or surfaces of the disclosed embodiment, merely for the purposes of illustration and not by way of limitation, the present invention provides an improved actuating mechanism (15) having a housing (16), a gear transfer system (18) enclosed in the housing, a threaded barrel (19) extending from the housing, a screw rod (20) threaded for movement through the barrel, an end plate (21) mounted to the housing opposite the barrel, where the transfer system communicates with a driver input (22) and the barrel, whereby rotation of the transfer system will cause rotation of the barrel and axial movement of the screw rod through the barrel.

The transfer system may comprise two perpendicular beveled gears (23, 24). One of the beveled gears may be a ring gear (23) and the other beveled gear may be a pinion gear (24). The driver input may comprise a square recess set in the pinion gear. The driver input may be adapted for operation with either a pneumatic driver or a manual driver. The housing may be a split housing (25, 26). The housing may contain gear lubricant. The end plate may include an end connection (28) which may be a clevis. The end connection may be a bearing plate. The screw rod may include an end connection (32). The end plate may be removable from the housing.

The present invention also discloses an actuating mechanism in which the barrel and housing are adapted to allow removal of the end plate and the insertion of a second screw rod (31) threaded for movement through the barrel opposite the first screw rod, whereby rotation of the transfer system will cause axial movement of both screw rods through the barrel.

Accordingly, the general object of the present invention is to provide an actuating mechanism with an improved structure which is durable, easy to operate, and versatile.

Another object is to provide an actuating mechanism which has a compactly enclosed and contained gear transfer system.

Another object is to provide an improved actuating mechanism in which the housing of the gear transfer system may be filled with a lubricant.

Another object is to provide an improved actuating mechanism in which the gearing mechanisms are lubricated so that the life of the device may be extended.

Another object is to provide an improved actuating mechanism which employs a single barrel for both tensioning and compressing.

Another object is to provide improved actuating mechanism in which the moving parts are protected so as to improve durability.

Another object is to provide an improved actuating mechanism in which the device may be driven by a variety of hand held power tools, such as electric drivers, hydraulic drivers, pneumatic drivers, or may be operated manually if desired.

Another object is to provide an improved actuating mechanism with a gear system that provides a mechanical advantage.

Another object is to provide an improved actuating mechanism which may be used with a variety of end fittings or connections.

Another object is to provide an improved actuating mechanism which is provided with a split housing to allow easy maintenance and repair.

Another object is to provide an improved actuating mechanism which is adapted for use as either a tensioning device, such as a turnbuckle, or as a compression device, such as a linear actuator.

Another object is to provide an improved actuating mechanism which allows for stationary operation.

These and other objects and advantages will become apparent from the foregoing and ongoing written specification, the drawings, and the appended claims.

BRIEF DESCRIPTION OF THE DRAWINGS

FIG. 1 is a front elevation of the actuating mechanism.

FIG. 2 is an exploded plan view of the actuating mechanism showing FIG. 1.

FIG. 3 is a front elevation of the actuating mechanism with the end plate removed and a second screw bolt inserted.

FIG. 4 is an exploded plan view of the actuating mechanism shown in FIG. 3.

FIG. 5 is a sectional view of the pinion gear shown in FIG. 2.

FIG. 6 is an alternate embodiment of the actuating mechanism shown in FIG. 1 showing a manual driver attachment.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or access of rotation, as appropriate.

Referring now to the drawings, and, more particularly, to FIG. 1 thereof, this invention provides an improved actuating mechanism, of which the presently preferred embodiment is generally indicated at 15. Actuating mechanism 15 is shown as broadly including a screw rod 20, a barrel 19, a housing 16, and an end plate 21. As shown in FIG. 1, access to a driver input 22 is provided through housing 16.

As shown in FIG. 2, screw rod 20 is a substantially cylindrical solid member elongated along axis x—x. Screw rod 20 is left-hand threaded along its right outer surface. Screw rod 20 has an end connection 32 at its left end. End connection 32 is a clevis and allows for attachment to corresponding end connections or fittings.

Barrel 19 is a substantially hollow cylindrical member elongated along axis x—x. Barrel 19 is provided with threads corresponding to screw bolt 20 along its inwardly-facing cylindrical surface. Barrel 19 is formed by a conventional upset forging process and then threaded. The diameter of the outer surface of screw rod 20 is slightly less than the diameter of the inwardly-facing cylindrical surface of barrel 19. Accordingly, screw rod 20 may be rotated into barrel 19 and will telescope into and out of barrel 19.

As shown in FIG. 2, a gear transfer system 18 is positioned at the right end of barrel 19 and enclosed by housing 16. Gear transfer system 18 is comprised of two perpendicular beveled gears, indicated at 23 and 24. Beveled gear 23 is a ring gear, which is fixably connected to the outside surface of barrel 19. Thus, rotation of ring gear 23 will cause a corresponding rotation in barrel 19. Barrel 19, screw rod 20 and ring gear 23 are coaxial.

As shown in FIG. 2, the teeth of ring gear 23 facing to the right. Pinion gear 22 is a substantially-circular solid member oriented around an axis perpendicular to axis x—x. Pinion gear 22 is in a perpendicular arrangement with ring gear 23 such that the teeth of ring gear 23 mesh with the upwardly-facing teeth of pinion gear 24. Accordingly, rotation of pinion gear 24 will cause a correspondent right angle rotation of ring gear 23 and barrel 19. Gear transfer system 18 also includes a ring gear bearing 33, a needle bearing 34, and a bearing 45 and a snap ring 35 on the right end of barrel 19.

As shown in FIG. 1, gear transfer system 18 is enclosed within housing 16. Housing 16 is a substantially square member having a hollow interior so as to enclose gear transfer system 18. Housing 16 is formed from two symmetric members, a right side 26 and a left side 25. Housing 16 is provided with a through-bore having a diameter slightly larger than the outside diameter of barrel 19. As such, left side 25 slides over the left end of barrel 19 and up against ring gear bearing 33. Similarly, right side 26 fits against bearing 45 and, in turn, snap ring 35 at the right end of barrel 19. As shown, two rubber O-rings, severally indicated at 41, provide a tight fit at the junctions between housing 16 and barrel 19. Left side 25 and right side 26 are connected along seam 36 to generally enclose and protect gear transfer system 18.

As shown in FIG. 1, housing 18 is also provided with an access port from which the end of pinion gear 24 and needle bearing 34 protrude. As shown in FIG. 5, the protruding end of pinion gear 24 is provided with a driver input 22. In the preferred embodiment, driver input 22 is a square recess which accommodates a square drive bit. A chamfer 43 is provided at the end of driver input 22. Driver input 22 allows for pinion gear 24 to be rotated by a manual driver or power operated driver such as pneumatic drivers, electronic drivers, or hydraulic drivers. Thus, housing 16 encases gear transfer system 18 and allows access to a driver such that pinion gear 24 may be rotated to effect a corresponding rotation to ring gear 23 and barrel 19.

As shown in FIG. 6, driver input 22 may include a manual driver attachment 42. As shown in FIG. 6, manual driver attachment 42 is a hand wheel which may be rotated clockwise or counter-clockwise to cause the same rotation of pinion gear 24.

The interior of housing 16 is filled with a gear lubricant such as grease. In this way, the gears and barrel rotate smoothly and with less wear to the gear teeth and other contacting surfaces. A conventional grease insert or cup (not shown) is provided on barrel 19 to allow grease to be injected with a conventional grease gun into barrel 19 to lubricate the telescoping action of screw rod 20 and barrel 19. A similar insert is employed on housing 16 to allow grease to be easily injected into housing 16.

As shown in FIGS. 1–2, an end plate 21 is bolted to the right side of housing 16. Four bolts, severally indicated at 30, and nuts, severally indicated at 44, are used to attach end plate 21 to housing 16. End plate 21 includes an end connection 28. End connection 28 is shown as a clevis. However, numerous other types of connections or fittings may be employed. Thus, depending on the type of connection needed, various end plates may be available such that one end plate may be removed and replaced with another end plate having a different type of connection or fitting.

As shown in FIG. 4 and mentioned above, actuating mechanism 15 is adapted such that end plate 21 may be removed from housing 16. End plate 21 is removed by unscrewing bolts 30. The removal of end plate 21 allows access to the right end of barrel 19 by way of the right through-bore into housing 16. Thus, once end plate 21 is removed, a second screw rod 31 may be rotated into the right end of barrel 19 and will telescope into and out of barrel 19.

Second screw rod 31 is right-hand threaded along its left end such that its threading corresponds with the inwardly-facing threads of barrel 19. Second screw rod 31 is, similar to screw rod 20, a cylindrical solid member elongated along axis x—x. Second screw rod 31 is provided with an end connection 40.

By removing end plate 21 and replacing it with second screw rod 31, actuating mechanism 15 will operate like a turnbuckle. Because screw rod 20 and second screw rod 31 are threaded in opposite directions, when barrel 19 rotates about axis x—x, and provided end connections 32 and 40 are fixed with respect to rotation about axis x—x, screw rods 20 and 31 will move in opposite directions. Thus, depending on which direction barrel 19 rotates about axis x—x, screw rods 20 and 31 will either move away from housing 16 or towards housing 16.

Accordingly, actuating mechanism 15 is structured such that, when used with end plate 21 attached to a fixed and stationary body, it will act as a linear actuator having a stationary gear transfer system. When end plate 21 is replaced with second screw rod 31, actuating mechanism 15 will operate as a turnbuckle. Screw rods having alternate end connections or fittings may be used interchangeably. Accordingly, actuating mechanism 15 provides a great deal of versatility.

MODIFICATIONS

The present invention contemplates that many changes and modifications may be made. The particular materials of which the various body parts and component parts are formed are not deemed critical and may be readily varied. Similarly, the particular shape of the individual component parts may be altered, modified or varied by a skilled designer.

While the end connections are shown as being clevis fittings, various other fittings may be used, such as hooks, bearing plates, eye fittings, stubs or claws. Similarly, while a square driver input is shown, numerous other configured driver inputs may be used or a non-recessed or protruding driver connection may be employed. While a bolted connection is used between the end plate and the housing, other connections may be employed which perform a similar function and allow for a removable connection.

Therefore, while the presently-preferred form of the actuating mechanism has been shown and described, and several modifications discussed, persons skilled in this art will readily appreciate that various additional changes and modifications may be made without departing from the spirit of the invention, as defined and differentiated by the following claims.

What is claimed is:

1. An actuating mechanism comprising,
a housing,
a gear transfer system enclosed in said housing,
a threaded barrel extending from said housing,
a screw rod threaded for movement through said barrel,
an end plate mounted to said housing opposite said barrel,
said transfer system communicating with a driver input and said barrel,
whereby rotation of said transfer system will cause rotation of said barrel and axial movement of said screw rod through said barrel.

2. The actuating mechanism as set forth in claim 1, wherein said transfer system comprises two perpendicular beveled gears.

3. The actuating mechanism as set forth in claim 2, wherein said beveled gears are a ring gear and a pinion gear.

4. The actuating mechanism as set forth in claim 3, wherein said driver input comprises a square recess set in said pinion gear.

5. The actuating mechanism as set forth in claim 1, wherein said driver input is adapted for operation with a pneumatic driver.

6. The actuating mechanism as set forth in claim 5, wherein said driver input is adapted for operation with a manual driver.

7. The actuating mechanism as set forth in claim 1, wherein said housing is a split housing.

8. The actuating mechanism as set forth in claim 1, wherein said housing contains gear lubricant.

9. The actuating mechanism as set forth in claim 1, wherein said end plate includes an end connection.

10. The actuating mechanism as set forth in claim 9, wherein said end connection is a clevis.

11. The actuating mechanism as set forth in claim 9, wherein said end connection is a bearing plate.

12. The actuating mechanism as set forth in claim 1, wherein said screw rod includes an end connection.

13. The actuating mechanism as set forth in claim 1, wherein said end plate is removable.

14. The actuating mechanism as set forth in claim 1, wherein said barrel and said housing are adapted to allow for the removal of said end plate and the insertion of a second screw rod threaded for movement through said barrel opposite said first screw rod,
whereby rotation of said transfer system will cause axial movement of both said screw rod and second screw rod through said barrel.

* * * * *